United States Patent [19]

Lepain et al.

[11] Patent Number: 4,462,910

[45] Date of Patent: Jul. 31, 1984

[54] OIL SLICK DISPERSANTS USING DIGUANIDINIUM SALT

[75] Inventors: Andre Lepain, Rosieres; Robert D. E. M. Bronchart, Brussels, both of Belgium

[73] Assignee: Cosden Technology, Inc., Dallas, Tex.

[21] Appl. No.: 463,372

[22] Filed: Feb. 3, 1983

[51] Int. Cl.³ .......................... C02F 3/00; B01F 17/16
[52] U.S. Cl. .................................. 210/610; 210/922; 252/357; 252/312
[58] Field of Search ................ 252/312, 357; 210/925, 210/610, 922

[56] References Cited

U.S. PATENT DOCUMENTS

| | | | |
|---|---|---|---|
| 4,110,213 | 8/1978 | Tennant et al. | 210/925 |
| 4,146,470 | 3/1979 | Mohan et al. | 252/312 |
| 4,230,562 | 10/1980 | Olivieri et al. | 210/925 |
| 4,271,190 | 6/1981 | Bertelmann et al. | 424/316 |

Primary Examiner—Richard D. Lovering
Assistant Examiner—Anne Brookes
Attorney, Agent, or Firm—Michael J. Caddell

[57] ABSTRACT

A process for disposing of oil slicks on seawater comprises treating the polluted seawater with a liquid dispersing composition and a nitrogen-containing nutrient for the seawater micro-organisms which are active in oil metabolization. The nutrient is a diguanidinium salt having the general formula:

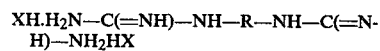

wherein R is preferably an alkyl radical containing from 2 to 12 carbon atoms and X is a halogen or an acid anion.

11 Claims, No Drawings

OIL SLICK DISPERSANTS USING DIGUANIDINIUM SALT

BACKGROUND OF THE INVENTION

The present invention discloses surface-active compositions for treating and dispersing oil slicks. This invention is also directed to a method for disposing of oil slicks.

Pollution of seawater by oil (crude oil or fractions of crude oil) occasioned by accidents, off-shore drilling operations, and/or discharge of ballast water or spillage from oil tankers, results in the formation of a continuous film or slick of oil which tends to continuously spread. In open seas, this oily film is undesirable because it constitutes a barrier to the transfer of air and light from the atmosphere into the seawater, which are indispensable to support marine life. In coastal waters, the oily film does damage to the crustacia beds and to the beaches.

One way of dealing with such pollution problems is to use oil dispersing compositions containing surface-active compounds. These compositions are applied on the oil slicks, generally by spraying means. They disintegrate the cohesive oily film into small droplets and disperse the droplets into the water column to a depth of several meters under the sea surface. The film is thus broken and there is again a transfer of air and light from the atmosphere. Moreover, fouling of the solid structures and beaches along the coasts is avoided.

The oil droplets which are dispersed under the sea surface are then biodegraded and consumed by micro-organisms which are living in seawater and are active in oil metabolism. This biological degradation is however a slow process and is consequently unable to prevent the settling of undegraded oil droplets and the formation of oil deposits on the floor of seas, more particularly where the water is shallow.

An active biodegradation of oil droplets needs the presence of a high amount of micro-organisms at the oil-water interface. However, these organisms are present in seawater in limited quantities. In order to stimulate the biodegradation, it is therefore necessary to speed up the proliferation of the micro-organisms. To this end, they need not only oxygen and carbon, which are present respectively in water and in polluting oils, but also nitrogen and phosphorous. Generally, the concentration of these latter two elements is very low in seawater and consequently the natural biodegradation of oil is a very slow process.

In order to increase the biodegration rate, it has been proposed to add microbial nutrients to seawater. Mineral salts, such as ammonium salts, nitrates and phosphates, have been used. But these mineral salts are too water-soluble and have practically no affinity for the polluting oil. They are too quickly dissolved and dispersed into sea water and are not maintained at the oil-water interface where their presence is needed.

It has also been suggested to use nitrogen-containing organic nutrients which are oleosoluble, such as condensation products of urea or melamine with aldehydes. However, these organic compounds are also soluble in water. They dissociate from the oil and are dissipated into the aqueous phase. In order to overcome this disadvantage, it has been proposed to modify their solubility in water. For instance, condensation products of urea and an aldehyde containing less than four carbon atoms are first absorbed on an inert carrier and are then rendered lipophilic by coating with a paraffin or other protective colloid. These treatments require special equipment and they increase the cost of nutrients. Moreover, these latter cannot be suspended in the surface-active compositions which are used for the treatment of the oil slicks. Two separate applications, one for the surface-active composition and one for the nutrients, are therefore required. Furthermore, the coating might be quickly dissolved if the polluting oil, such as a fresh crude oil, contains aromatic hydrocarbons.

Other techniques have been suggested to reduce the solubility of the nutrients in water, but the result is compositions which only float on the water surface. These nutrients will not then promote the development of micro-organisms in the water column under the sea surface where the oil droplets are dispersed.

The difficulties encountered with prior art dispersants have been overcome by the development of new lipophilic nutrients for the micro-organisms which are present in sea waters and are active in oil degradation. These new nutrients achieve a rapid and more complete biodegradation of the oils, at low cost.

SUMMARY OF THE INVENTION

It is an object of the present invention to provide a process for disposing of oil slicks on seawater by treating the polluted water with a dispersing composition and with a water-stable nitrogen-containing compound which is poorly soluble in water.

It is another object of the invention to improve the biodegradation of the oil in an oil slick by treating the polluted water with a dispersing composition and a nitrogen-containing compound to increase the development of micro-organisms which are active in metabolizing oil.

A further object of the invention is to provide a nutrient for seawater micro-organisms comprising a nitrogen-containing compound which is oleophilic and which exhibits a low toxicity towards aquatic flora and fauna.

These and further objects have been achieved by treating oil polluted seawater with a dispersing composition and a nitrogen-containing nutrient for the micro-organisms, said nutrient consisting of a diguanidinium salt having the general formula:

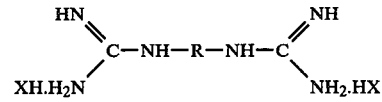

wherein R is an alkyl radical containing from about 2 to about 12 carbon atoms and X is a halogen or an acid anion.

DESCRIPTION OF PREFERRED EMBODIMENTS

The process of the present invention for disposing of oil slicks on seawater comprises treating the oil slicks with a dispersing composition and a diguanidinium salt as hereinabove defined.

The diguanidinium salts may be prepared by the conventional method of reacting a diamine salt ($XH.H_2N-R-NH_2.HX$) with cyanamid ($H_2N-C\equiv N$, R and X being as hereinabove mentioned). An amine salt or a mixture of amine salts may also be used. The molar ratio between the diamine salt and the cyanamid is at least 1:2. By way of example, 1,6-bis-guanidinohexane hydrochloride, having the formula:

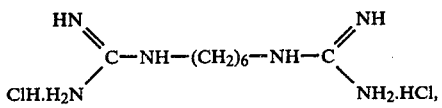

is prepared from 1,6-diaminohexane and cyanamid by introducing 1 mole of diamine, which has been previously dried and dissolved in isopropyl alcohol, into a flask equipt with a stirrer, a thermometer and an outlet tube linked to a Dan and Stark decanter provided with a water cooler. Then, 3 moles of hydrochloric acid are slowly introduced into the flask. After reaction, the water and isopropyl alcohol are removed. Xylene is then added and the mixture is heated under reflux in order to remove any remaining traces of water. When the mixture has cooled down to about 80° C., 2 moles of cyanamid are added to it and the reaction mixture is heated to 140° C. and held there for 2 hours. After cooling, the reaction mixture is filtered, washed with alcohol, stirred at 60° C. for 30 minutes in the presence of alcohol containing about 1% active carbon, and filtered on a millipore filter. After elimination of residual solvent, 1,6-bisguanidinohexane chloride is obtained with a purity of about 98%.

The nitrogen content of the diguanidinium salts depends upon the specific R and X, but it lies generally in the range of about 15 to about 40%.

Diguanidinium salts were the radical contains 12 or even more carbon atoms may be used. However, taking into account the availability and the price of the diamine, it is more advantageous to prepare diguanidinium salts wherein the radical R contains only up to about 8 carbon atoms. Moreover, depending upon the selection of the radicals R and X, one can prepare diguanidinium salts which are either soluble in or can be suspended in most dispersing compositions. Diguanidinium salts wherein R contains from 2 to 6 carbon atoms have this characteristic and therefore they may be applied in solution or suspension in the dispersing composition. If the diguanidinium salt is not soluble or cannot be suspended in the dispersant, it can be added to the polluted water, either before or after application of the dispersant.

In the above given formula, X may be a halogen, more particularly chlorine, or an acid anion, such as the radical of sulphuric acid, nitric acid, methyl- or ethylsulphuric acid, alkylbenzenesulphonic acid, acetic acid, lactic acid or similars. For economic reasons, it may be advantageous to prepare diguanidinium salts where X is Cl or the radical of sulphuric acid, nitric acid or acetic acid. The radical X may also be selected in order to obtain diguanidinium salts which are soluble or easily suspended in the usual dispersing compositions. For example, diguanidinium salts, wherein R is the dodecyl radical, are practically insoluble in most dispersing compsitions when X is Cl, but are soluble in these compositions when X is the radical of lactic acid.

In order to promote the development of micro-organisms, the diguanidinium salts are advantageously employed in admixture with a phosphorous compound which also acts as a nutrient to supply phosphorous. The phosphorous compound may be an alkaline or alkaline-earth salt of phosphoric ester of fatty alcohol, a salt or an ester of organophosphonic acid, or a phosphatide or similar product having a low toxicity towards aquatic flora and fauna. Esters obtained by neutralization of hexamethylene diamine tetra(methylene phosphonic acid) of formula

with an amine, such as monoethanolamine or a fatty amine containing from 12 to 18 carbon atoms, give good results. Phosphatides or phospholipids such as lecithin or kephaline provide both nitrogen and phosphorous, and thus reinforce the action of the diguanidinium salts.

According to one preferred embodiment of this invention, diguanidinium salts, wherein the radical R contains up to 8 carbon atoms, are preferably employed. They are used in solution with or suspended in dispersing compositions containing at least one surface-active compound and at least one solvent exhibiting a low toxicity towards aquatic flora and fauna.

Useful surface-active compounds can include ethoxylated tall oil, mono- or polyesters of polyhydroxylic alcohols, more particularly the esters of saturated or unsaturated aliphatic carboxylic acids containing from 12 to 20 carbon atoms and of alcohols, such as sorbitol, glycerol and polyethyleneglycol. Mixtures of two or more of these esters may be used, with the optional addition of other surface-active agents, such as ethoxylated fatty alcohols, alkaline salts of dialkyl sulphosuccinates, or condensation products of ethylene oxide or propylene oxide on the above-mentioned esters.

The surface-active agents are dissolved in at least one solvent having a low toxicity towards aquatic flora and fauna. The solvent serves a double purpose: it facilitates the handling and the application of the surface-active agents, and due to its affinity, it promotes the penetration of the composition into the oil film. Useful solvents include liquid hydrocarbons containing less than 5%, and preferably less than 3% aromatic compounds. Liquid hydrocarbons which are preferred solvents are those having from 5 to 20 carbon atoms, such as paraffinic hydrocarbons containing from 6 to 12 carbon atoms, cycloparaffinic hydrocarbons such as cyclopentane and cyclohexane, alkyl-cycloparaffinic hydrocarbons, and napthenic hydrocarbons. Aliphatic alcohols containing up to 8 carbon atoms, such as ethyl-, propyl- and isopropyl alcohols, and glycols monoethers, more particularly monoalkylethers (where the alkyl radical contains from 10 to 4 carbon atoms) of glycols, such as mono- or diethyleneglycol and mono- or di-propyleneglycol are also suitable solvents. The organic solvent may also contain water in an amount which does not exceed the amount of organic solvent.

The weight ratio of surface-active agents to solvent may vary between wide limits. It is desirable to employ compositions which are as concentrated as possible, but the amount of solvent in the composition must be sufficient to dissolve the surface-active agents and nutrients and also allow the application of the composition at low temperatures. It has been found that compositions containing more than about 85% of surface-active agents and nutrients are generally too viscous at low temperatures. Moreover they do not easily penetrate the oil slick and are therefore less active. On the other hand, compositions containing less than about 30% of surface-active agents and nutrients have a low effectiveness.

The amount of dialkylguanidinium salt in the dispersing compositions may vary between relatively wide limits and may be as high as 35% or even more, based on the total weight of composition. This amount depends upon many factors, such as the specific guanidinium salt used and its nitrogen content, the optional presence of other nutrients, and the specific solvent used. Compositions containing from about 2 to about 20 wt %, and more particularly from about 5 to about 15 wt %, of dialkylguanidinium salt are very effective with respect to the biodegradation of oil droplets dispersed in seawater.

The compositions of the present invention may also contain other components such as magnesium and calcium which are beneficial to the development of microorganisms. These elements may be present in the form of organic salts, namely in the form of magnesium or calcium salt of alkylbenzenesulphonic acid. The amount of these additives generally does not exceed about 3%, based on the total weight of the composition.

The compositions are applied to oil slicks by conventional application methods. They may be diluted with water and sprayed on oil slicks from aircraft or boats provided with suitable spraying means.

EXAMPLE 1

The following dispersing composition was prepared (parts by weight):
53 parts diethyleneglycol monobutylether
23 parts polyethyleneglycol monooleate (mean molecular weight of the glycol: 400)
6.5 parts sorbitan monolaurate
9.5 parts water
8 parts bisguanidinobutane hydrochloride The toxicity of this composition was determined by subjecting the species Artemia salina to increasing doses of the composition to determine the maximum amount of composition which, after 24 hours, will still leave 50% of the tested species alive (test CL 50–24 hours). It was found that the determined 50% toxicity level was 3,500 ppm.

Biodegradation effectiveness is determined by the following method:
200 ppm of the tested composition is added to unsterilized seawater (700 ml) containing topped crude oil (5000 ppm). This is left to incubate for 41 days at 25° C., while being stirred by air bubbling. The residual oil is then extracted and compared to the original amount of crude oil. It was found that the biodegradation effectiveness with the above composition was 1.8 times higher than that of a similar but nutrient-free composition, and 1.4 times higher than that of a similar composition containing ammonium nitrate instead of bisguanidinobutane hydrochloride.

EXAMPLE 2

A composition as described in Example 1 was prepared, but by using bisguanidinoethane hydrochloride as the diguanidinium salt.

The characteristics of this composition, with respect to toxicity and biodegradation effectiveness, were the same as the characteristics of the composition of Example 1.

EXAMPLE 3

The following dispersing composition was prepared (parts by weight):
16.70 parts Sorbitan monooleate
13.50 parts ethoxylated sorbitan monooleate (about 20 moles of ethylene oxide)
24 parts sodium salt of di(2-ethylhexyl)sulphosuccinate (a 75% aqueous solution)
11.25 parts water
12 parts monoethyleneglycol monobutylether
2.50 parts diethyleneglycol
15 parts bisguanidinohexane nitrate
5 parts monoethanolamine ester of hexamethylenediamine tetra(methylenephosphonic acid).

With this composition, the biodegradation effectiveness was 1.8 times higher than that of a similar, but nutrient-free composition.

EXAMPLE 4

A composition as described in Example 3 was prepared, but by using bisguanidinohexane lactate as the nitrogen-containing nutrient.

The biodegradation effectiveness was 1.6 times higher than that of the nutrient-free composition.

EXAMPLE 5

Bisguanidinododecane acetate was prepared from 1,4-diaminododecane acetate and cyanamid.

50 ppm of a mixture containing 65% of this biguanidinium salt and 35% lecithin was added to unsterilized seawater (700 ml) containing topped crude oil. 150 ppm of a commercial dispersing composition was then added. The mixture was maintained at 25° C. for 41 days, while being stirred by air bubbling. The residual oil was extracted by methylene chloride.

It was found that the biodegradation effectiveness was 1.7 times higher than that of the nutrient-free, commercial dispersing composition.

The embodiments of the invention in which an exclusive property or privilege is claimed are defined as follows:

1. A process for reducing oil slicks on seawater comprising treating oil-polluted seawater with a liquid dispersing composition and a nitrogen-containing nutrient for seawater micro-organisms which are active in oil metabolization, said nutrient being a diguanidinium salt having the general formula

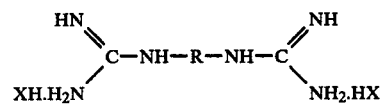

wherein R is an alkyl radical containing from about 2 to about 12 carbon atoms and X is a halogen or an acid anion.

2. The process of claim 1, wherein R is an alkyl radical containing from 2 to about 8 carbon atoms.

3. The process of claim 2, wherein R contains from 2 to 6 carbon atoms.

4. The process of claim 1, wherein X is selected from the group consisting of chlorine and the anions of nitric acid, sulphuric acid, methylsulphuric acid, ethylsulphuric acid, alkylbenzenesulphonic acid, acetic acid, and lactic acid.

5. The process of claim 1 comprising treating the polluted seawater with a liquid dispersing composition containing at least one surface-active compound, at least one solvent and at least one diguanidinium salt which is easily dispersed in said composition.

6. A liquid dispersing composition for reducing crude oil pollution in seawater, said composition containing at least one surface-active compound, at least one solvent for said compound, and a diguanidinium salt.

7. The composition of claim 6, containing up to 35% by weight of diguanidinium salt.

8. The composition of claim 7, containing from 2–20% by weight of diguanidinium salt.

9. The composition of claim 7, containing from 5–15% by weight of diguanidinium salt.

10. The composition of claim 6, further comprising a phosphorous compound for supplying a nutrient for seawater micro-organisms.

11. The composition of claim 10, comprising from about 30 to about 85 wt % of surface-active compound, diguanidinium salt and phosphorous compound.

* * * * *

UNITED STATES PATENT AND TRADEMARK OFFICE
CERTIFICATE OF CORRECTION

PATENT NO. : 4,462,910
DATED : July 31, 1984
INVENTOR(S) : Andre Lepain et al

It is certified that error appears in the above—identified patent and that said Letters Patent is hereby corrected as shown below:

On the title page:

Change name, address and corporation of Assignee from:

COSDEN TECHNOLOGY, INC., Dallas, Texas

Corporation of Delaware

To:

LABOFINA, S.A., Brussels, Belgium

Corporation of Belgium

Signed and Sealed this

Second Day of April 1985

[SEAL]

*Attest:*

DONALD J. QUIGG

*Attesting Officer*     *Acting Commissioner of Patents and Trademarks*